United States Patent [19]

Beckman

[11] 4,270,861
[45] Jun. 2, 1981

[54] PHOTOSENSOR CIRCUIT FOR PHOTOGRAPHIC PRINTER

[75] Inventor: Gregg S. Beckman, St. Louis Park, Minn.

[73] Assignee: Pako Corporation, Minneapolis, Minn.

[21] Appl. No.: 73,105

[22] Filed: Sep. 6, 1979

[51] Int. Cl.³ .................... G03B 27/73; G03B 27/80
[52] U.S. Cl. ........................................ 355/38; 355/68
[58] Field of Search .................... 355/35–38, 355/67–71, 83, 88, 77; 354/23 D, 60 D

[56] References Cited

U.S. PATENT DOCUMENTS

| 3,795,444 | 3/1974 | Gliddenet al. | 355/68 |
| 3,992,098 | 11/1976 | Wirtz | 355/68 |
| 4,125,326 | 11/1978 | Baert | 355/74 |
| 4,140,391 | 2/1979 | Laciak et al. | 355/38 |

Primary Examiner—L. T. Hix
Assistant Examiner—W. J. Brady
Attorney, Agent, or Firm—Kinney, Lange, Braddock, Westman and Fairbairn

[57] ABSTRACT

A photographic printer includes large area transmission density (LATD) sensors and a digital processor, such as a microprocessor, which calculates red, green and blue exposure times based upon the LATD sensor readings. The LATD sensors provide analog photosignals which are a function of light received. Voltage controlled oscillators for each color channel provide red, green pulse signals which have durations which are a function of the red, green and blue analog photosignals, respectively. Red, green and blue gate circuitry receives red, green and blue enable signals from the microprocessor together with the red, green and blue pulse signals from the voltage controlled oscillators. The outputs of the gate circuitry are red, green and blue gate signals which are supplied to red, green and blue counters, respectively, and permit the counters to count in response to a high frequency clock signal. The resulting count in each counter, therefore, is a function of the duration of the gate signal which it received. Each time one of the gate signals is completed, an interrupt circuit provides signals to the microprocessor indicating that a count is complete for one of the color channels and the microprocessor retrieves the count from the appropriate counter.

7 Claims, 3 Drawing Figures

PHOTOSENSOR CIRCUIT FOR PHOTOGRAPHIC PRINTER

REFERENCE TO CO-PENDING APPLICATION

Reference is made to a co-pending application Ser. No. 074,399 by J. Fauchier entitled "Exposure Time Control for Photographic Printer" which was filed on even date with this application and is assigned to the same assignee.

BACKGROUND OF THE INVENTION

1. Field of the Invention

The present invention relates to photographic printers. In particular, the present invention is an improved photosensor circuit for converting analog photosignals to digital values for use by a digital processor.

2. Description of the Prior Art

Photographic printers produce photographic prints from photographic film originals (generally negatives) by passing high intensity light through the film to expose the photographic emulsion layers of a photosensitive medium. The emulsion layers are subsequently processed to produce a print of the scene contained in the original.

In order to increase efficiency and minimize time required to fill customer orders, high speed printers have been developed in which many exposures are made in edge-to-edge relationship on a single roll of print paper. After the exposures are made, the roll is removed from the printer, is photoprocessed to produce prints, and is cut into individual prints. The prints are then sorted by customer order and ultimately packaged and sent to the customer.

A critical portion of a photographic printer is the exposure time control, which controls the duration of the exposure of the photosensitive medium. The exposure time control may utilize inputs from several different sources in order to determine the proper duration of the exposure. For example, most automatic printers use large area transmission density (LATD) sensors to sample the light transmitted by the negative either prior to or during the exposure. In addition, many automatic printers include an automatic density correction (ADC) or color scanning station which scans the negative prior to printing and corrects the exposure time in the event of an abnormality in illumination of the negative known as "subject failure". The operator may also enter density or color correction signals from the operator control panel. Based upon some or all of these input signals, the exposure time control determines the proper exposure time for each of the color channels based upon predetermined exposure time relationships.

In many prior art printer systems, the exposure times are controlled automatically by the LATD photocell signals by means of analog integration of the LATD photosignals. The integrated signal levels required to terminate exposure were determined by density and color controls. This technique, however, has a number of drawbacks. In particular, in most photographic systems, changes in density and color on a logarithmic rather than a linear scale. Since the analog integration technique is not logarithmic, additional circuit complexity is required to convert the settings at the density and color control, which read logarithmically, to the appropriate analog integration signal levels.

Furthermore, digital control systems provide much greater flexibility and capability for various automatic exposure corrections than are possible with an analog type system. Digital systems, however, require some form of conversion of the analog photosignal to a digital signal which is then processed by a digital processor to calculate the appropriate exposure times. In general, most digital control systems for photographic printers have used conventional analog-to-digital conversion circuits.

The photographic printer shown in U.S. Pat. No. 4,125,326, which is assigned to the same assignee as the present application, shows (in FIG. 17) another approach to exposure control on a digital basis. In this system, the sensor photosignal from each LATD sensor is supplied to a voltage controlled oscillator and controls the rate at which the oscillator produces output pulses. The output of the oscillator drives a counter which counts up until the count in the counter corresponds to a digital value selected by the density switch controls. While this approach has been used successfully in several photographic printers, it is intended primarily for a photographic printer which does not have computer controls for calculating exposure times. In addition, this system requires neutral density filters on the LATD sensors so that the outputs of the LATD sensors are matched.

There is continuing need for photosensor circuits in photographic printers which require no neutral density filters, which provide high accuracy in sensor reading, and which provide flexibility in the operation of the sensors under computer control.

SUMMARY OF THE INVENTION

The present invention is an improved photosensor circuit for use in a photographic printer having digital processor means for controlling exposure times. The photosensor circuit of the present invention, when enabled by the digital processor means, provides digital sensor counts or readings which are a function of light received.

In the present invention, photosensor means provides an analog photosignal which is a function of the light received. Oscillator means receives the analog photosignal and provides a pulse signal having a duration which is a function of the analog photosignal. Gate circuit means receives the pulse signal from the oscillator means and an enable signal from the digital processor means. When the enable signal is received, the gate circuit means provides a gate signal which corresponds in duration to the pulse signal from the oscillator means.

The gate signal from the gate circuit means is supplied to counter means to cause the counter means to count in response to a high frequency clock signal of a predetermined frequency. The counter means counts only when the gate signal is supplied by the gate circuit, and therefore, the magnitude of the count produced in the counter means, depends upon the duration of the gate signal.

When a gate signal is completed and the counter means has completed counting, interrupt circuit means provides signals to the digital processor means indicating the completion of a sensor reading. The digital processor means then retrieves the count from the counter means.

DETAILED DESCRIPTION OF THE PREFERRED EMBODIMENT

Figure 1:
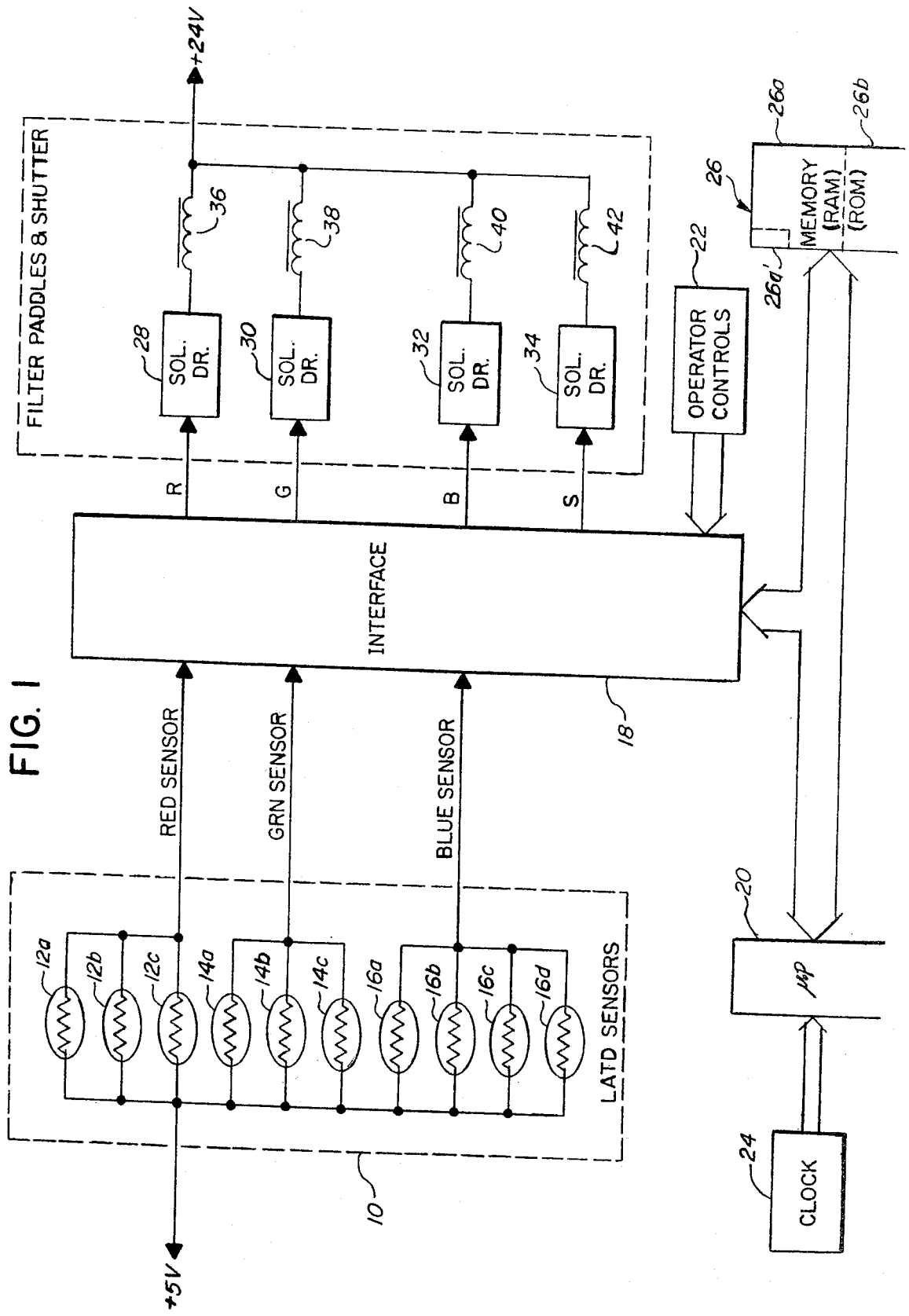
FIG. 1 is an electrical block diagram of an exposure control system for a photographic printer.

In FIG. 1, a block diagram of an exposure control system for a subtractive type photographic printer is shown. The printer is of the type having large area transmission density (LATD) sensors 10 which sense light from a negative which is to be printed. In one preferred embodiment, LATD sensors 10 are mounted in a ring positioned between the negative and the focusing optics of the photographic printer, such as shown in U.S. Pat. No. 4,125,326 which is assigned to the same assignee as the present application. In the embodiment shown in FIG. 1, LATD sensors 10 include three red sensitive sensors 12a, 12b and 12c which produce a RED SENSOR signal; three green sensitive sensors 14a, 14b and 14c which produce a GREEN SENSOR signal; and four blue sensitive sensors 16a, 16b, 16c and 16d which produce a BLUE SENSOR signal.

The RED SENSOR, GREEN SENSOR and BLUE SENSOR signals are supplied through interface circuitry 18 to microprocessor 20. The photosensor circuit of the present invention (which is shown in detail in FIGS. 2 and 3) is included within interface circuitry 18 and converts the analog RED SENSOR, GREEN SENSOR and BLUE SENSOR signals to digital counts ("raw sensor data") which may be processed by microprocessor 20. Also supplied to microprocessor 20 are operator control signals produced by operator controls 22. These operator control signals may include, for example, color or density button corrections desired by the operator for a particular print, and may also include control settings for selecting a particular color balance setup.

Clock 24 supplies clock signals to microprocessor 20. Memory 26 preferably includes both random access read/write memory (RAM 26a) and read only memory (ROM 26b) which are used by microprocessor 20 in controlling operation of the exposure control system.

Memory 26 preferably contains color balance setup information for a plurality of different color balance setups representing different combinations of film type, film size and print paper size. Operator controls 22 include means such as a thumbwheel switch for selecting one of the plurality of color balance setups which is stored in memory 26. The selected or "active" color balance setup is loaded into an Active Setup Buffer (designated 26a' in FIG. 1) which is a predetermined set of locations within the RAM 26a of memory 26. The color balance setup information which is loaded into the Active Setup Buffer 26a' includes in one successful embodiment the following: log intensities and log times for a normal or reference negative, and under and over slopes. In addition to the setup information, the Active Setup Buffer 26a' also contains current correction values, sensor readings (i.e. log intensities for the negative then being printed) and the results of the exposure calculations.

In the exposure control system shown in FIG. 1, microprocessor 20 supplies control signals through interface circuitry 18 to solenoid drivers 28, 30, 32 and 34 which drive red filter paddle solenoid 36, green filter paddle solenoid 38, blue filter paddle solenoid 40 and shutter solenoid 42, respectively. Solenoids 36, 38, 40 and 42 control the position of the filter paddles and the shutter in the optical path of the printer, and thereby controlling the exposure of the photographic print paper in each of the three color channels (i.e. red, green and blue).

In the previously mentioned co-pending application by J. Fauchier, LATD sensors 10 operate in two distinctly different modes prior to and during an exposure cycle. As will be discussed in detail later, the present invention permits operation under control of microprocessor 20 in both of these modes. Prior to the start of an exposure, solenoid 42 is de-energized and the shutter is in place in the optical path so that no light reaches the photographic print paper. Microprocessor 20 provides signals to interface 18 to initialize the readings of the red, green and blue LATD sensors, and initial readings for all three sensor signals are taken. As each sensor reading is completed, signals are provided which allow microprocessor 20, to calculate logarithmic values and stores the logarithmic values in Active Setup Buffer 26a'.

When all three sensor readings are completed, all three exposure times are calculated based upon the information stored in Active Setup Buffer 26a', which includes the three logarithmic values, current correction values (based upon any color or density button correction received from the operator control 22) and the setup information for the selected color balance setup. The calculation of the three exposure times must await the completion of all three sensor readings because sensor readings for all three colors must be available to calculate any one of the exposure times.

Once the three exposure times have been calculated, microprocessor 20 stores a red, a green and a blue exposure time in the active setup buffer in both a $log_2$ and a two's complement form. The two's complement exposure times are called set point counts for the red, green and blue color channels. Exposures are timed by microprocessor 20, which increments a counter (which is preferably a memory location within memory 26) each time a real time clock signal is received. When the count in the counter equals one of the set point counts, the exposure for that particular color channel is terminated by microprocessor 20.

Interface 18 also includes a real time clock circuit which provides the real time clock signal at one of four different frequencies. This real time clock circuit will be described in detail in the previously mentioned co-pending application by J. Fauchier. The four real time clock frequencies permit the total range of exposure times to be divided up into four subranges in order to provide the desired time and accuracy. Microprocessor 20 selects a scale factor representing the desired clock range as well as the desired count range of the set point counts stored in the active setup buffer.

After calculation of the initial set point counts and selection of the real time clock frequency, microprocessor 20 initiates an exposure cycle by supplying a signal to solenoid driver 34 which causes the shutter to be driven out of the light path. Once the exposure cycle is started, microprocessor 20 also enables the LATD signal processing circuitry within interface 18, and LATD sensors 10 enter their second mode of operation. In this mode LATD sensors 10 run asynchronously in parallel with the exposure time for the duration of the exposure.

Each time one of the LATD sensors has completed a reading, the sensor data is supplied to microprocessor 20, which recalculates the exposure time for that particular color channel. The recalculated exposure time is based upon the newly received sensor reading and upon the previously stored running average sensor readings for the other two color channels. Based upon the recalculated exposure time, microprocessor 20 modifies the appropriate set point count contained in Active Setup Buffer 26a'. In this manner, the exposure times are continuously corrected throughout the exposure cycle by the LATD sensor readings taken during the exposure cycle.

The exposure time for each channel is controlled by microprocessor 20. Each time a real time clock signal is received, microprocessor 20 is interrupted, and increments the time count stored in RAM 26a. When, for example, the time count plus the red set point count equals 10000 H, microprocessor 20 supplies a drive signal through interface circuitry 18 to solenoid driver 28 to energize solenoid 36 to drive the red filter paddle into light path and terminate the exposure in the red color channel. The time count continues to be incremented until all three exposure times have been completed. When the third and last color channel completes its timing, microprocessor 20 drives the shutter into the light path.

The raw sensor data from LATD sensors 10 and interface circuitry 18 is conditioned by microprocessor 20 prior to being used in calculation of exposure times. This conditioning, which is described in detail in the co-pending application by J. Fauchier, provides greater accuracy in the resultant exposure time. Basically, there are two phases to the conditioning of the raw sensor data by microprocessor 20. First, bad data points are sorted out and are not used in controlling exposures. Second, microprocessor 20 maintains running averages of the red, green and blue sensor data.

Figure 2:
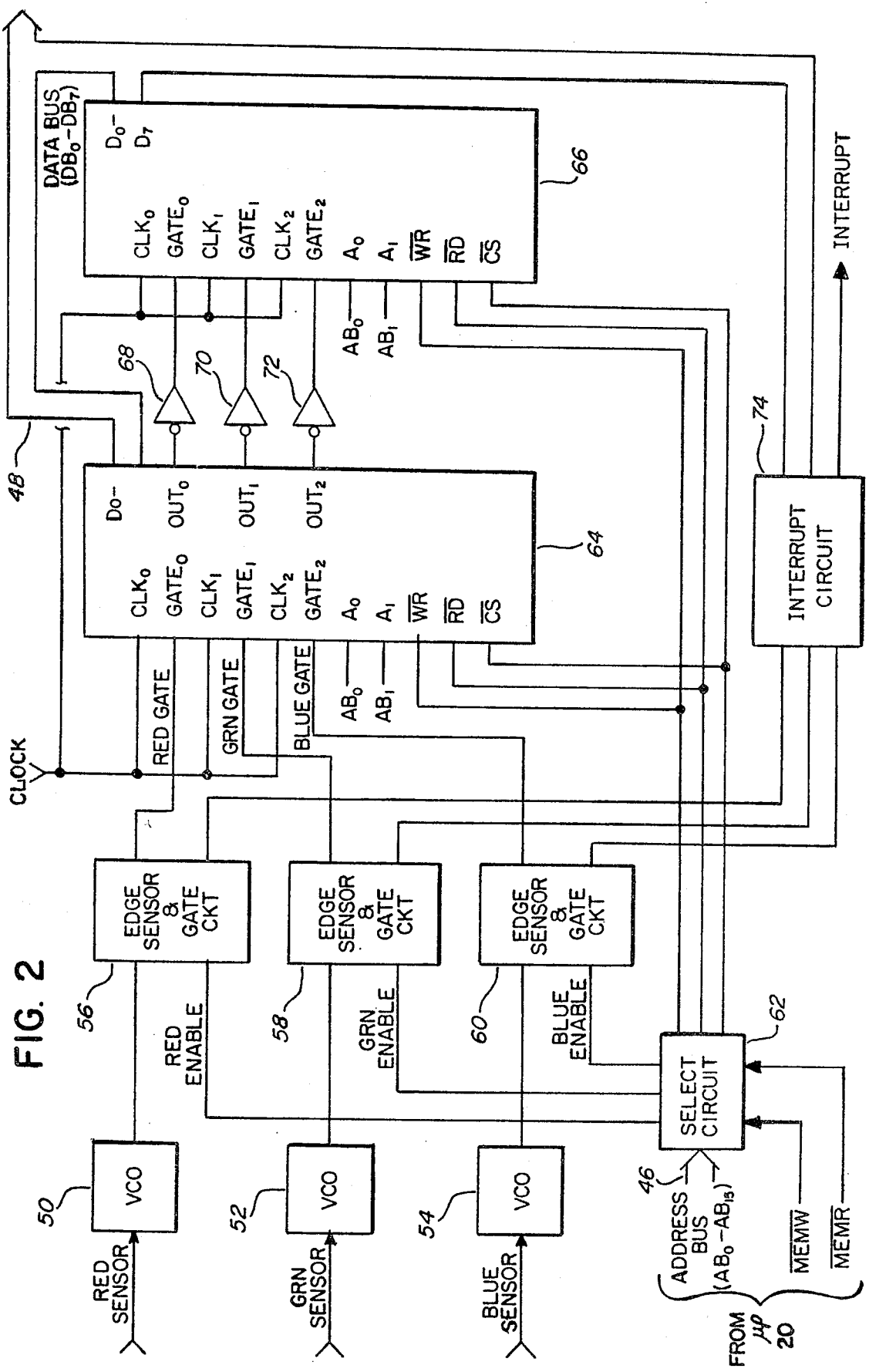
FIG. 2 is an electrical block diagram showing a preferred embodiment of a portion of the interface circuitry of the exposure control system of FIG. 1.

FIG. 2 shows a block diagram of a preferred embodiment of the present invention. In particular, FIG. 2 shows a portion of interface circuit 18 which provides the raw sensor data in digital form to microprocessor 20. Control signals are received from microprocessor 20 through address buss 46, and $\overline{\text{MEMW}}$ and $\overline{\text{MEMR}}$ lines, and sensor data is supplied to microprocessor 20 over data buss 48.

The RED SENSOR, GREEN SENSOR and BLUE SENSOR signals from LATD sensors 10 are supplied to voltage controlled oscillators (VCO's) 50, 52 and 54, respectively. The output of VCO 50 is a pulse output signal whose duration is a function of the RED SENSOR signal, and therefore the light which is sensed by LATD red sensors 12a, 12b and 12c. As the red light intensity increases, the pulse width of the output pulse from VCO 50 decreases. Similarly, as the red light intensity decreases, the pulse width from VCO 50 increases. Similarly, VCO 52 supplies output pulses representative of the GREEN SENSOR signal, and VCO 54 supplies output pulses whose pulse width is a function of the BLUE SENSOR signal.

The outputs of VCO's 50, 52 and 54 are supplied to edge sensor and gate circuits 56, 58 and 60, respectively. These circuits also receive ENABLE signals from microprocessor 20 through select circuit 62. The output of edge sensor and gate circuits 56, 58 and 60 are a RED GATE signal, a GREEN GATE signal, and a BLUE GATE signal and are supplied to counter circuitry formed by counters 64 and 66 and inverters 68, 70 and 72. In one preferred embodiment, counters 64 and 66 are Intel 8253 programmable interval time/counter integrated circuits. In this embodiment, counters 64 and 66 are each organized as three independent sixteen-bit counters. The outputs $OUT_0$, $OUT_1$ and $OUT_2$ from least-significant-bit counter 64 are supplied to the $GATE_0$, $GATE_1$ and $GATE_2$ inputs, respectively, of most-significant-bit counter 66. The counter circuitry, therefore, acts as three independent thirty-two bit counters, one for the red color channel, one for the green color channel, and one for the blue color channel.

CLOCK signals are supplied to the clock inputs of counters 64 and 66. These CLOCK signals have a much higher frequency than the pulse output of VCO's 50, 52 and 54. Alternatively, separate CLOCK signals may be supplied to counters 64 and 66. In this alternative embodiment, the two clock signals have the same frequency but different phase.

Microprocessor 20 supplies signals to select circuit 62, which in turn provides the appropriate RED, GREEN or BLUE ENABLE signals. As described previously, in the first phase of operation, prior to initiation of an exposure, sensors for all three colors are enabled at the same time. After initiation of the exposure and throughout the duration of the exposure, the sensors are again enabled and operate asynchronously on a rotating priority basis which will be described later.

For the purposes of illustration, the operation of the circuit shown in FIG. 2 will be described with reference to the red color channel. It should be understood, however, that the operation in the green and blue color channels is identical. When the RED ENABLE signal is received by edge sensor 56 and when the output of voltage control oscillator 50 first goes high, the RED GATE signal also goes high, thereby enabling the thirty-two bit red channel counter within counters 64 and 66. The red counter begins to count at a rate determined by the fixed frequency CLOCK signal supplied to the $CLK_0$ input. The red count continues to increase until the output of VCO 50 goes low. The change of state of the output of VCO 50 causes the RED GATE signal to go low, thereby terminating the red count. It can be seen, therefore, that the magnitude of the red count is an indication of the duration of the output pulse of VCO 50. The longer the pulse width of the RED GATE signal pulse from VCO 50, the higher the red count, and conversely the shorter the pulse width of the RED GATE signal pulse, the lower the red count contained in counters 64 and 66. As discussed previously, the pulse width from VCO 50 is a function of the RED SENSOR signal, and therefore, the intensity of the light sensed by red LATD sensors 12a, 12b and 12c. As the light intensity increases, the pulse width of the RED GATE signal from VCO 50 decreases, and therefore, the red count in counters 64 and 66 will be reduced. Similarly, a decrease in light sensed by sensors 12a, 12b and 12c results in a RED GATE signal pulse from VCO 50 of longer duration, which in turn results in a larger red count in counters 64 and 66.

When the RED GATE signal goes low, edge sensor and gate circuit 56 also supplies a signal to interrupt circuit 74, which supplies an INTERRUPT signal to microprocessor 20, and which also supplies information over data buss 48 indicating which of the three color channels has completed a reading. Microprocessor 20 then interrogates the counters 64 and 66 through select circuitry 62 and receives the thirty-two bit red count in eight-bit bytes. In addition, microprocessor 20 terminates the RED ENABLE signal which had been supplied to edge sensor and gate circuit 56.

Since the time required to produce the red, green and blue counts will differ in nearly all cases, the times at which microprocessor 20 receives INTERRUPT signals for the three sensor readins will also differ. During the initial mode of operation prior to initiation of an exposure, all three channels are enabled at the same time. As each channel completes its count, interrupt circuit 74 signals microprocessor 20, which retrieves the appropriate count (i.e. the "raw sensor data") from counters 64 and 66 for that color channel. This data is converted to a two-byte logarithimic value and is stored until all sensor readings for all three colors have been completed. When the final count has been completed and the raw sensor data is received by microprocessor 20, all three exposure times are calculated. As discussed previously, the exposure set point counts initially calculated are used at the initiation of the exposure, and are modified during the course of the exposure as new red, green and blue counts are completed in counters 64 and 66 and new INTERRUPT signals are supplied by interrupt circuit 74.

When the exposure is initiated, microprocessor 20 again enables the LATD sensors for all three color channels. As the output of each VCO 50, 52 and 54 goes high, the RED GATE, GREEN GATE and BLUE GATE signals go high and the red, green and blue counters begin counting in response to the high frequency CLOCK signal supplied at the $CLK_0$, $CLK_1$ and $CLK_2$ inputs of counters 64 and 66. Since the intensities of the red, green and blue light sensed by LATD sensors 12a–12c, 14a–14c and 16a–16d usually will be different, the pulse widths of the RED GATE, GREEN GATE and BLUE GATE signal pulses of VCO's 50, 52 and 54 will also be different. The RED GATE, GREEN GATE and BLUE GATE signals, therefore, will end at different times. In one preferred embodiment, the sensors are re-enabled on a rotating priority basis so that all three color channels will receive updated sensor readings. In this embodiment, the blue sensors are re-enabled after each blue interrupt because the blue sensors are the slowest, i.e. they take the longest time to complete a blue count. After each red interrupt, the GREEN ENABLE signal is supplied so that a GREEN GATE signal is produced and a green count is generated. During this time period, the red sensors are in effect inactive, since the RED ENABLE signal is not supplied to edge sensor and gate circuit 56, and the RED GATE signal is low. Similarly, after a green interrupt, the RED ENABLE signal is provided and the GREEN ENABLE signal remains low, thereby causing the GREEN GATE signal to remain low. This rotating priority avoids the possibility of lock-out of the blue sensors which have the lowest number of interrupts.

When one of the color channels times out, the rotating priority is modified. The readings of the sensors continue until the exposure is completed for their respective color channels. The number of readings which are taken during exposure for each channel will depend, of course, on the length of the exposure time in that particular color channel. Typically, about ten to thirty additional sensor readings for each color channel are made during an exposure. The use of additional sensor readings significantly increases the accuracy of the exposure times which are calculated, since a weighted average of all readings is taken and individual bad data points are eliminated. Since the additional sensor readings are taken during rather than before initiation of an exposure, time delays prior to initiation of exposures are minimized while improved accuracy of sensor readings and exposure times is achieved.

Figure 3:
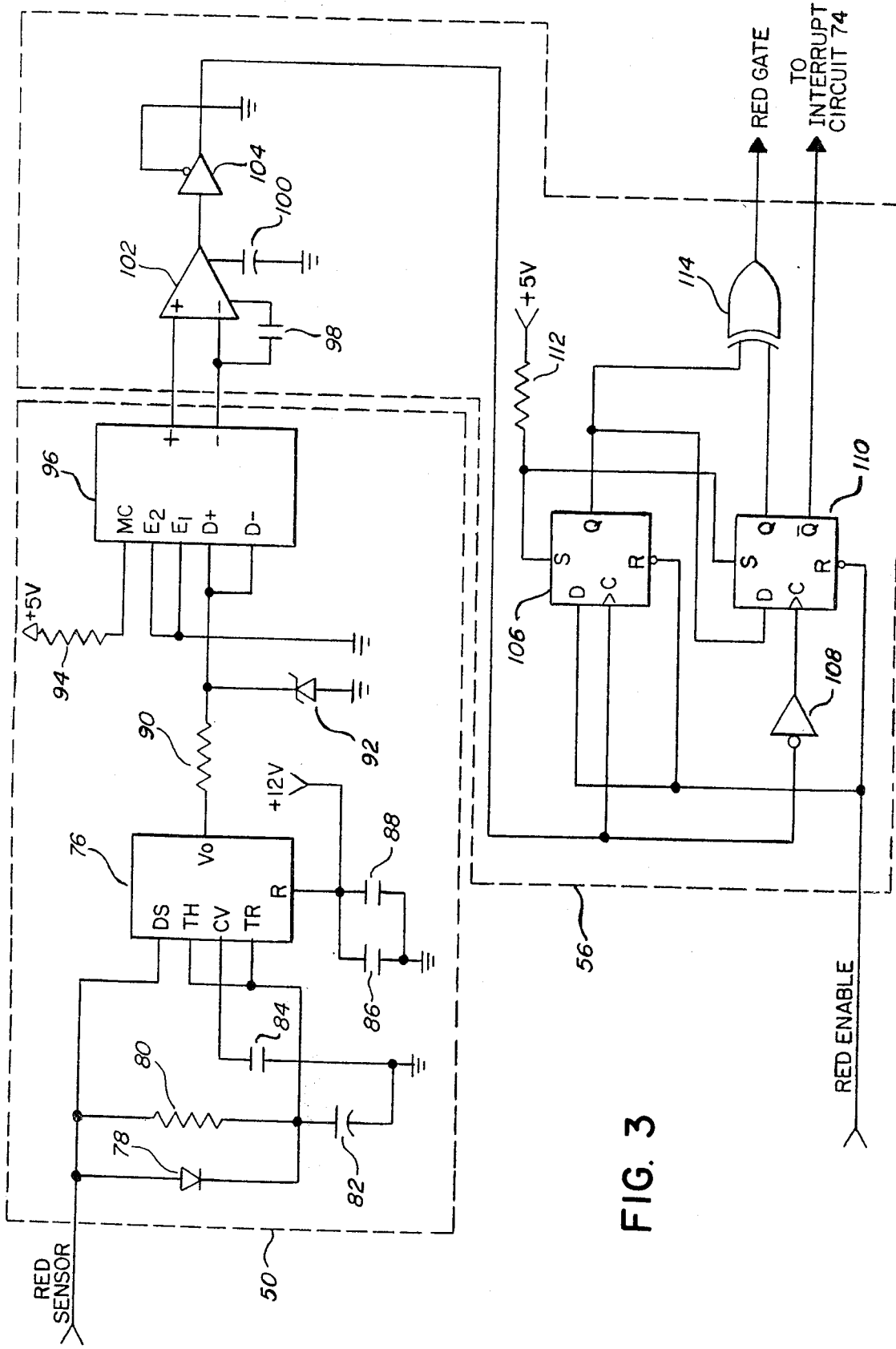
FIG. 3 is an electrical schematic diagram showing the voltage controlled oscillator, edge sensor and gate circuitry of a preferred embodiment of the circuitry shown in FIG. 2.

FIG. 3 shows an electrical schematic diagram of VCO 50 and edge sensor and gate circuit 56. VCO's 52 and 54 are similar to VCO 50, and edge sensor and gate circuits 58 and 60 are similar to circuit 56.

The circuits shown in FIG. 3, therefore, are also representative of the green and blue color channels, as well as the circuitry found in the red color channel.

The RED SENSOR signal received from red LATD sensors 12a, 12b and 12c is a current which is supplied to VCO 50, which is formed by 555-type integrated circuit timer 76, diode 78, resistor 80, and capacitors 82, 84, 86 and 88. The RED SENSOR signal is supplied to the discharge (DS) input of timer 76. In addition, the RED SENSOR signal charges capacitor 82 through diode 78. The junction of capacitor 82 and resistor 80 is connected to both the threshhold (TH) and the trigger (TR) inputs of timer 76. When the voltage at the threshhold and trigger inputs reaches a predetermined level, the output ($V_0$) of timer 76 goes low and capacitor 82 is discharged. Once capacitor 82 has been discharged, the output of timer 76 again goes high and capacitor 82 again begins charging through diode 78.

The output of timer 76, therefore, is a pulse signal which goes high for a duration which is determined by the time required to charge capacitor 82 to the threshhold voltage. The output then goes low for a brief period while capacitor 82 is discharged and then again goes to high to begin another output pulse. The duration of the high output from timer 76, therefore, is a function of the RED SENSOR signal, which in turn is determined by the intensity of light received by red sensors 12a, 12b and 12c. An increase in the intensity of the light received results in a larger RED SENSOR signal current, which causes capacitor 82 to be charged at a faster rate, and the duration of the high output pulse from timer 76 to decrease. Conversely, a decrease in light intensity received results in a decrease in the RED SENSOR signal current and an increase in the charging time of capacitor 82. This results in a longer high output pulse from timer 76.

The output of timer 76 is supplied to a driver circuit including resistor 90, Zener diode 92, resistor 94, and integrated circuit driver 96. The output of driver 96 is supplied to edge sensor and gate circuit 56.

The "+" and "−" outputs from driver circuit 96 are received by an amplifier circuit including capacitors 98 and 100 and comparator 102. The output of comparator 102 is buffered by gate 104 and supplied to a Clock input of flipflop 106 and through inverter 108 to a Clock input of flipflop 110. The RED ENABLE signal is supplied to the Reset inputs of both flipflop 106 and flipflop 108, and also is supplied to the D input of flipflop 106. Pull-up resistor 112 is connected between the S inputs of flipflops 106 and 110 and a +5 volt power supply to establish the proper voltage levels at the S inputs. The Q output of flipflop 106 is supplied to the D input of flipflop 110 and to one input of exclusive OR gate 114. The Q output of flipflop 110 is the other input to exclusive OR gate 114, and the Q̄ output of flipflop 110 is supplied to interrupt circuit 74 (shown in FIG. 2). The output of exclusive OR gate 114 is the RED GATE signal which is supplied to counter 64 (shown in FIG. 2).

The RED ENABLE signal is normally low, and goes high when microprocessor 20 wishes to enable the red sensor circuit to produce a red sensor reading. A low RED ENABLE signal holds both flipflop 106 and flipflop 110 in a reset state with their Q outputs low. In this state, therefore, the RED GATE signal is low and no counting of the red counters within counters 64 and 66 can take place. In addition, when the RED ENABLE signal is low, no interrupt from the red channel is allowed.

When the RED ENABLE signal goes high, it removes the resets from flipflops 106 and 110. In addition, it applies a high input to the D input of flipflop 106. The next time that the output of timer 76 goes high, thereby causing the output of comparator 102 to go from low to high, flipflop 106 is clocked, and due to the high state of the RED ENABLE signal at the D input, the Q output of flipflop 106 goes high. Since the Q output of flipflop 110 remains low, the output of exclusive OR gate 114 (i.e. the RED GATE signal) goes high. This enables counters 64 and 66 containing the red count to begin counting in response to the CLOCK signals.

The RED GATE signal remains high and the counters continue to count as long as the Q output of flipflop 110 remains low hile the Q output of flipflop 106 is high. When the output of timer 76 goes low, the output of comparator 102 goes low, thereby causing the Clock input of flipflop 110 to go from low to high. Since the Q output of flipflop 106 (which is high) is being applied to the D input of flipflop 110, the Q output of flipflop 110 goes high. This causes the RED GATE signal to go low, thereby completing the red count within counters 64 and 66.

As stated above, the $\overline{Q}$ output of flipflop 110 is supplied to interrupt circuit 74. An INTERRUPT signal is then supplied to microprocessor 20. Microprocessor 20 interrogates interrupt ciruit 74 to determine which sensor produced the interrupt, receives the red count from counters 64 and 66, and causes the RED ENABLE signal to go low. Further sensor readings in the red channel will be inhibited until the RED ENABLE signal again goes high. As described previously, a rotating priority system preferably is used between the three sensor circuits so that each color channel has approximately the same number of additional sensor readings made. The circuit shown in FIG. 3 permits microprocessor 20 to enable the sensors selectively to achieve this rotating priority.

The photosensor circuit of the present invention has several important advantages. First, it does not require neutral density filters over the LATD photocells in order to match the responses of the photocells.

Second, the present invention permits the microprocessor 20 to obtain highly accurate digital conversions of the intensity of light received by the LATD sensors. Accuracies of up to thirty-two bits are possible with the specific embodiments shown in the present application. This is greater accuracy than is normally possible with conventional analog-to-digital conversion of LATD sensor readings.

Third, the bit depth (i.e. thirty-two bits in the embodiment shown) permits a wide range of possible sensor readings. This is particularly advantageous for negatives having very high density, in which the intensity of light received by the LATD sensor is low and the resulting digital counts are very large.

Fourth, the present invention is particularly well suited for operation under microprocessor control. The present invention permits the microprocessor to enable the sensors simultaneously, or permits the sensors to be operated asynchronously. Furthermore, the present invention permits sensor readings to be taken both before and during exposure.

Although the present invention has been described with reference to preferred embodiments, workers skilled in the art will recognize that changes may be made in form and detail without departing from the spirit and scope of the invention.

What is claimed is:

1. In a photographic printer having red, green and blue LATD sensor means for providing red, green and blue analog photosignals, respectively, and having digital processor means for controlling exposures, the improvement comprising:

oscillator means for providing red, green and blue pulse signals having pulse durations which are a function of the red, green and blue analog photosignals, respectively;

gate circuit means responsive to the red, green and blue pulse signals and responsive to red, green and blue enable signals from the digital processor means for providing a red gate signal having a pulse duration determined by the red pulse signal when the red enable signal is received, for providing a green gate signal having a pulse duration determined by the green pulse signal when a green enable signal is received, and for providing a blue gate signal having a pulse duration determined by the blue pulse signal when the blue enable signal is received;

means for providing clock signals of predetermined frequency;

red counter means responsive to the clock signals and the red gate signal for counting in response to the clock signal for the pulse duration of the red gate signal to provide a red count which is a function of the pulse duration of the red gate signal;

green counter means responsive to the clock signals and the green gate signal for counting in response to the clock signals for the pulse duration of the green gate signal to provide a green count which is a function of the pulse duration of the green gate signal;

blue counter means responsive to the clock signals and the blue gate signal for counting in response to the clock signal for the pulse duration of the blue gate signal to provide a blue count which is a function of the pulse duration of the blue gate signal; and interrupt means for providing an interrupt signal to the digital processor means to indicate completion of counting by one of the red, green and blue counter means;

wherein the digital processor means controls exposures as a function of the red, green and blue counts.

2. The invention of claim 1 wherein the interrupt means further provides signals to the digital processor means indicating which of the red, green and blue counter means has completed counting.

3. The invention of claim 1 wherein the pulse durations of the red, green and blue pulse signals are inversely related to the magnitudes of the red, green and blue analog photosignals, respectively.

4. The invention of claim 1 wherein the digital processor means receives the interrupt signals and provides the enable signals on an asynchronous basis.

5. In a photographic printer having photosensor means for providing an analog photosignal which is a function of light received, and having digital processor means for controlling exposures, the improvement comprising:
    means for providing a gate signal in response to an enable signal from the digital processor means, the gate signal having a first state and a second state and having a duration in the second state which is a function of the analog photosignal;
    means for providing clock signals of predetermined frequency;
    counter means for counting in response to the clock signals when the gate signal is in its second state, whereby a count of the counter means after the gate signal changes from its second state to its first state is a function of the duration of the gate signal in its second state; and
    means for providing a signal to the digital processor means indicating completion of counting by the counter means;
    wherein the digital processor means controls exposures as a function of the count of the counter means.

6. The invention of claim 5 wherein the means for providing the gate signal comprises:
    oscillator means for providing a pulse signal having a pulse duration which is a function of the analog photosignal; and
    gate circuit means responsive to the enable signal and the pulse signal for providing the gate signal.

7. The invention of claim 6 wherein the gate circuit means causes the gate signal to switch from the first state to the second state when the enable signal is present and a leading edge of the pulse signal is received, and causes the gate signal to switch from the second state to the first state when the enable signal is present and a trailing edge of the pulse signal is received.

* * * * *